(12) United States Patent
Surazski et al.

(10) Patent No.: US 10,298,752 B1
(45) Date of Patent: May 21, 2019

(54) UNIFIED COMMUNICATION SYSTEM

(71) Applicant: Fuze, Inc., Boston, MA (US)

(72) Inventors: Lukasz Surazski, Boston, MA (US); Julio Viera, Boston, MA (US); Keith Johnson, Boston, MA (US)

(73) Assignee: FUZE, INC., Boston, MA (US)

( * ) Notice: Subject to any disclaimer, the term of this patent is extended or adjusted under 35 U.S.C. 154(b) by 54 days.

(21) Appl. No.: 15/719,757

(22) Filed: Sep. 29, 2017

Related U.S. Application Data

(60) Provisional application No. 62/401,659, filed on Sep. 29, 2016.

(51) Int. Cl.
*H04M 3/42* (2006.01)
*H04M 3/54* (2006.01)
*H04M 3/51* (2006.01)
*H04M 3/523* (2006.01)

(52) U.S. Cl.
CPC ..... *H04M 3/42374* (2013.01); *H04M 3/5141* (2013.01); *H04M 3/5175* (2013.01); *H04M 3/523* (2013.01); *H04M 3/543* (2013.01)

(58) Field of Classification Search
CPC ...... H04M 3/42229; H04M 3/54; H04M 3/58; H04M 3/42059; H04M 7/0003; H04Q 2213/28
USPC ............ 379/211.02, 212.01, 211.01, 207.15, 379/201.01, 201.1, 207.12, 264, 268, 273, 379/266.1
See application file for complete search history.

(56) References Cited

U.S. PATENT DOCUMENTS

| | | | |
|---|---|---|---|
| 2004/0141508 A1* | 7/2004 | Schoeneberger | ... H04L 41/5064 370/401 |
| 2015/0094037 A1* | 4/2015 | Jung | .................... G06F 21/6218 455/414.1 |

* cited by examiner

*Primary Examiner* — Thjuan K Addy
(74) *Attorney, Agent, or Firm* — McDermot Will & Emery LLP

(57) ABSTRACT

Methods are provided for routing communications between different recipients at an entity having access to a shared communication log and using presence information. The methods include receiving a communication from a user to an entity by a primary recipient at a call center for the entity, obtaining identifying information for the user, storing a communication log regarding the communication of the user, identifying a current presence of a secondary recipient for the entity, transferring the communication from the primary recipient to the secondary recipient in response to the presence identification of the secondary recipient indicating the secondary recipient is accessible, updating the communication log with information regarding the transfer from the primary recipient to the secondary recipient, and providing the communication log to the secondary recipient during the communication between the first user and the primary recipient or secondary recipient.

20 Claims, 5 Drawing Sheets

UNIFIED COMMUNICATION SYSTEM

CROSS-REFERENCE TO RELATED APPLICATIONS

The present application claims the benefit of priority under 35 U.S.C. § 119 from U.S. Provisional Application No. 62/401,659 filed on Sep. 29, 2016, the disclosure of which is hereby incorporated by reference in its entirety for all purposes.

TECHNICAL FIELD

The present disclosure generally relates to a communication system, and more specifically relates to a unified communication system for multiple users that includes presence information and recorded communication logs.

BACKGROUND

Conventional communication systems provide a single communication channel between two parties. Such communication can occur over multiple modes such as chat, voice, video, meeting or voice over Internet protocol (VoIP). Further, some known communication systems can provide some form of communication log to a single party, such as a call or chat history.

SUMMARY

The present disclosure provides a computer-implemented method for routing communications between different recipients at an entity having access to a shared communication log and using presence information. The method includes receiving a communication from a user to an entity by a primary recipient at a call center for the entity. A recipient at the call center is assigned to receive incoming communications placed to the entity. The method further includes obtaining identifying information for the user, storing a communication log regarding the communication of the user and identifying a current presence of a secondary recipient for the entity. The secondary recipient is apart from the call center. The method also includes transferring the communication from the primary recipient to the secondary recipient in response to the presence identification of the secondary recipient indicating the secondary recipient is accessible, updating the communication log with information regarding the transfer from the primary recipient to the secondary recipient and providing the communication log to the secondary recipient during the communication between the first user and the primary recipient or secondary recipient.

The present disclosure also provides a system for routing communications between different recipients at an entity having access to a shared communication log and using presence information. The system includes a memory having instructions and one or more processors configured to execute the instructions to receive a communication from a user to an entity by a primary recipient at a call center for the entity. The recipient at the call center is assigned to receive incoming communications placed to the entity. The instructions also include obtaining identifying information for the user, storing a communication log regarding the communication of the user and identifying a current presence of a secondary recipient for the entity. The secondary recipient is apart from the call center. The instructions further include transferring the communication from the primary recipient to the secondary recipient in response to the presence identification of the secondary recipient indicating the secondary recipient is accessible, updating the communication log with information regarding the transfer from the primary recipient to the secondary recipient and providing the communication log to the secondary recipient during the communication between the first user and the primary recipient or secondary recipient. Additionally, the instructions also include transferring the communication from the secondary recipient to a tertiary recipient apart from the call center, updating the communication log with information regarding the transfer from the secondary recipient to the tertiary recipient and providing the communication log to the tertiary recipient.

The present disclosure also provides a non-transitory machine-readable storage medium including machine-readable instructions for causing a processor to execute a method for routing communications between different recipients at an entity having access to a shared communication log and using presence information. The method includes receiving a communication from a user to an entity by a primary recipient at a call center for the entity and a recipient at the call center is assigned to receive incoming communications placed to the entity, obtaining identifying information for the user, storing a communication log regarding the communication of the user and identifying a current presence of a secondary recipient for the entity. The secondary recipient is apart from the call center. The method further includes transferring the communication from the primary recipient to the secondary recipient in response to the presence identification of the secondary recipient indicating the secondary recipient is accessible, updating the communication log with information regarding the transfer from the primary recipient to the secondary recipient, providing the communication log to the secondary recipient during the communication between the first user and the primary recipient or secondary recipient and transferring the communication from the secondary recipient to a tertiary recipient apart from the call center. Additionally, the method includes updating the communication log with information regarding the transfer from the secondary recipient to the tertiary recipient, providing the communication log to the tertiary recipient, transferring the communication from the secondary recipient to a recipient at the call center and transferring the communication from the primary recipient to another recipient at the call center distinct from the primary recipient and subsequent to the transferring of the communication from the secondary recipient to the primary recipient. The identifying the current presence of the secondary recipient includes initiating a communication between the primary recipient and the secondary recipient and the communication includes audio communication. The communication is configured to enable video communication between the user and at least one of the primary recipient and the secondary recipient and the communication is received from a queue of communications assigned to the call center. Further, the secondary recipient includes a plurality of recipients, and the transferring of the communication from the primary recipient to the secondary recipient includes transferring the communication from the primary recipient to the plurality of recipients for communication between the user and the plurality of recipients.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
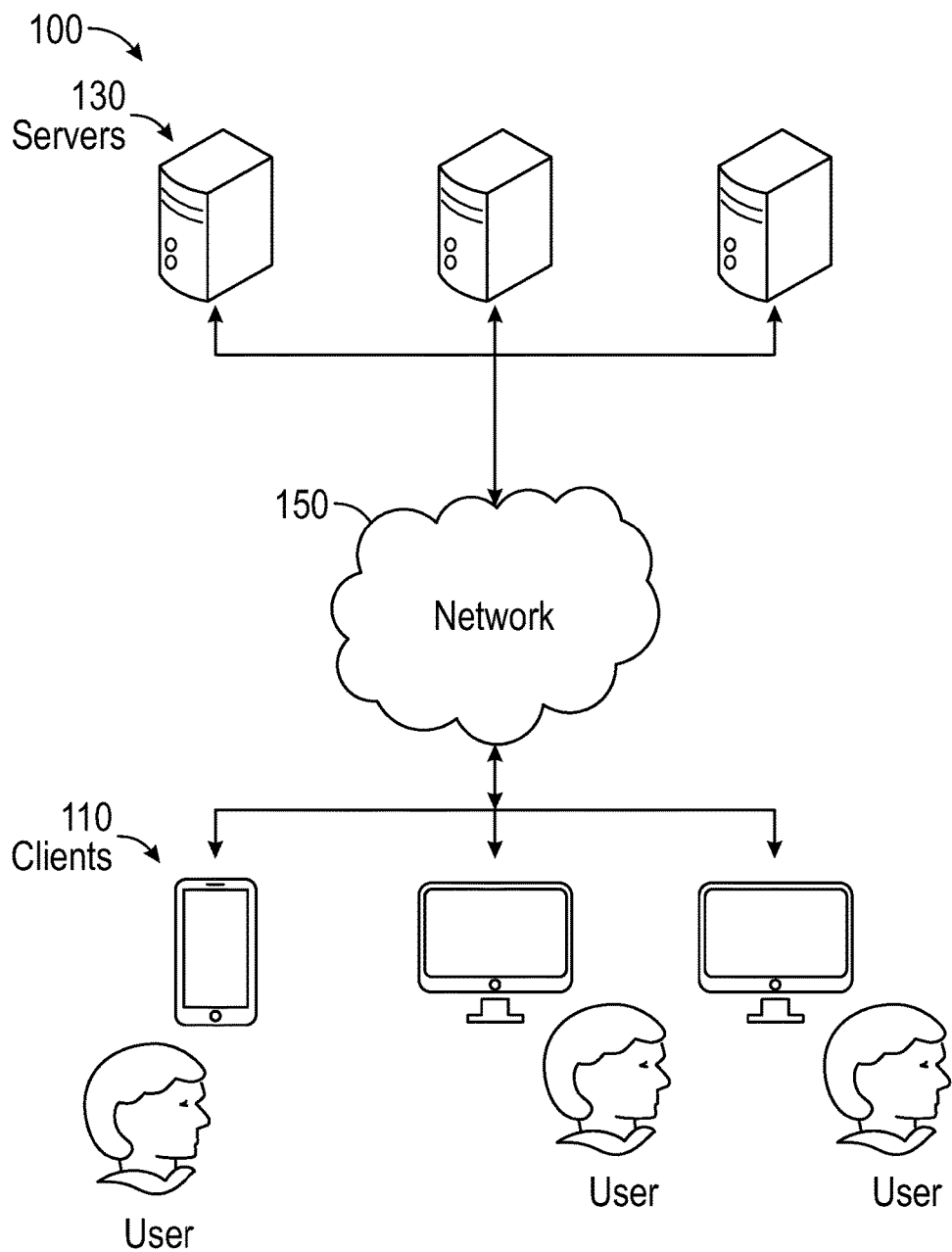
FIG. 1 illustrates an example architecture for routing communications between different recipients at an entity having access to a shared communication log suitable for practicing some implementations of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Existing communication applications are commonly able to generate some form of communication history such as a call or chat log. Existing communication applications are generally limited to a single modal communication, such as chat or call, as well as being generally limited to a single communication device type such as a hard phone or a desktop. Existing communication applications also commonly do not include actions performed during the communication in the call or chat log. Further, when such a communication log is generated, it is generally not routed between different recipients at an entity having access to the shared communication log. Additionally, the chat or call logs generated by existing communication applications are generally limited to providing data about the call or chat at the 'user' level, but not at the communication device level.

The disclosed system addresses a problem with existing communication applications, namely the inability to route communications between different recipients at an entity having access to a shared communication log, which is a problem specifically arising in the realm of computer networks. This problem is addressed by providing a technical solution rooted in computer technology, namely by routing communications between different recipients at an entity having access to a shared communication log.

The disclosed system provides several advantages, including routing communications between different recipients at an entity having access to a shared communication log, and in some implementations, providing the communication log across multiple communication modalities, such as, chat, phone, voice over Internet protocol (VoIP), video, video calls and meetings, SMS and meetings. The disclosed system also routes communications between different recipients at an entity having access to a shared communication log across multiple types of communication devices such as a hard desk phone, a mobile phone, a desktop computer, a fax machine, a smartphone, conference rooms, a software softphone, a browser-based softphone, etc. The disclosed system, in some implementations, supports call transfer in which the transfer of the ongoing communication between devices is considered as part of the ongoing communication rather than a new communication, and a user participating in the communication can switch devices during the ongoing communication. The disclosed system also supports a change in communication modalities during an ongoing communication and considers such a modality change as part of the ongoing communication rather than a new or different communication. For example, a modality change from voice to video during an ongoing communication can be seen as part of one single communication instead of two different communications. Some implementations of the disclosed systems and methods offer in real-time a unified communication log for a user based on his/her soft and desk phone call activity, instant messaging, video conferences, content shared and Application Programming Interface (API)-based integrated services notifications. The disclosed systems and methods also provide a unified communication log that includes content shared or a list of actions performed during the communication. The disclosed systems and methods can also resolve information about the users participating in the communication for example by using the phone numbers and extensions of the users to identify the corporations or other identifying information associated with the users.

The disclosed system and method provide advantages including providing the unified communication log data of a communication such that it can be visualized in a user interface to track and provide insights about advanced communication flows such as queues and previous actions taken (e.g. the call is transferred from a from a first recipient to a second recipient) and highlight communication flow across multiple devices.

Although certain examples provided herein may describe a user's, or recipient's, information being stored in memory, each user and/or recipient must grant explicit permission for such information to be stored in some implementations of the present disclosure. The explicit permission may be granted using privacy controls integrated into the disclosed system. Each user and/or recipient can be provided notice that such information will be stored with such explicit consent, and each user or recipient may at any time end having the information stored, and may delete the stored information. The stored information may be encrypted to protect user or recipient security.

The user or recipient can at any time delete the information from memory and/or opt out of having the user or recipient information stored in memory. Additionally, the user or recipient can, at any time, adjust appropriate privacy settings to selectively limit the types of information stored in memory, or select the memory in which the information is stored (e.g., locally on the user's or recipient's device as opposed to remotely a server). In many examples, the information does not include and/or share the specific identification of the user or recipient (e.g., the user's or recipient's name) unless otherwise specifically provided or directed by the user or recipient.

Example System Architecture

FIG. 1 illustrates an example architecture 100 for routing communications between different recipients at an entity having access to a shared communication log suitable for practicing some implementations of the disclosure. The communication can be a multi-modal communication including a first communication modality and a second communication modality different from the first communication modality. The architecture 100 includes one or more servers 130 and one or more clients 110 connected over a network 150. One of the servers 130 can be configured to host a system for routing communications between different recipients at an entity having access to a shared communication log between the clients 110 over the network 150. As such, the disclosed system can, for example, receive a plurality of communication logs related to the communication. Each communication log can include one or more actions of the communication, a listing of users participating in the one or more actions, and a plurality of devices associated with the plurality of users. The disclosed system can aggregate the one or more actions from the communication logs as a plurality of aggregated actions. A first device associated with a first user from among the plurality of users participating in a first action of the plurality of aggregated actions can be different from a second device associated with the first user participating in a second action of the plurality of aggregated actions. The disclosed system can resolve an identity of each user from among the plurality of users in the plurality of aggregated actions and store the plurality of aggregated actions into a communication log of the communication. For purposes of load balancing, multiple servers 130 can host the unified communication log, and/or the architecture for routing communications between different recipients at an entity having access to a shared communication log suitable for practicing some implementations of the present disclosure.

The servers 130 can be any device having an appropriate processor, memory, and communications capability for routing communications between different recipients at an entity having access to a shared communication log. The clients 110 to which the servers 130 are connected over the network 150 can be, for example, any communication device such as desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, one or more of the servers 130 can be a cloud computing server of an infrastructure-as-a-service (IaaS) and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example Unified Communication System

Figure 2:
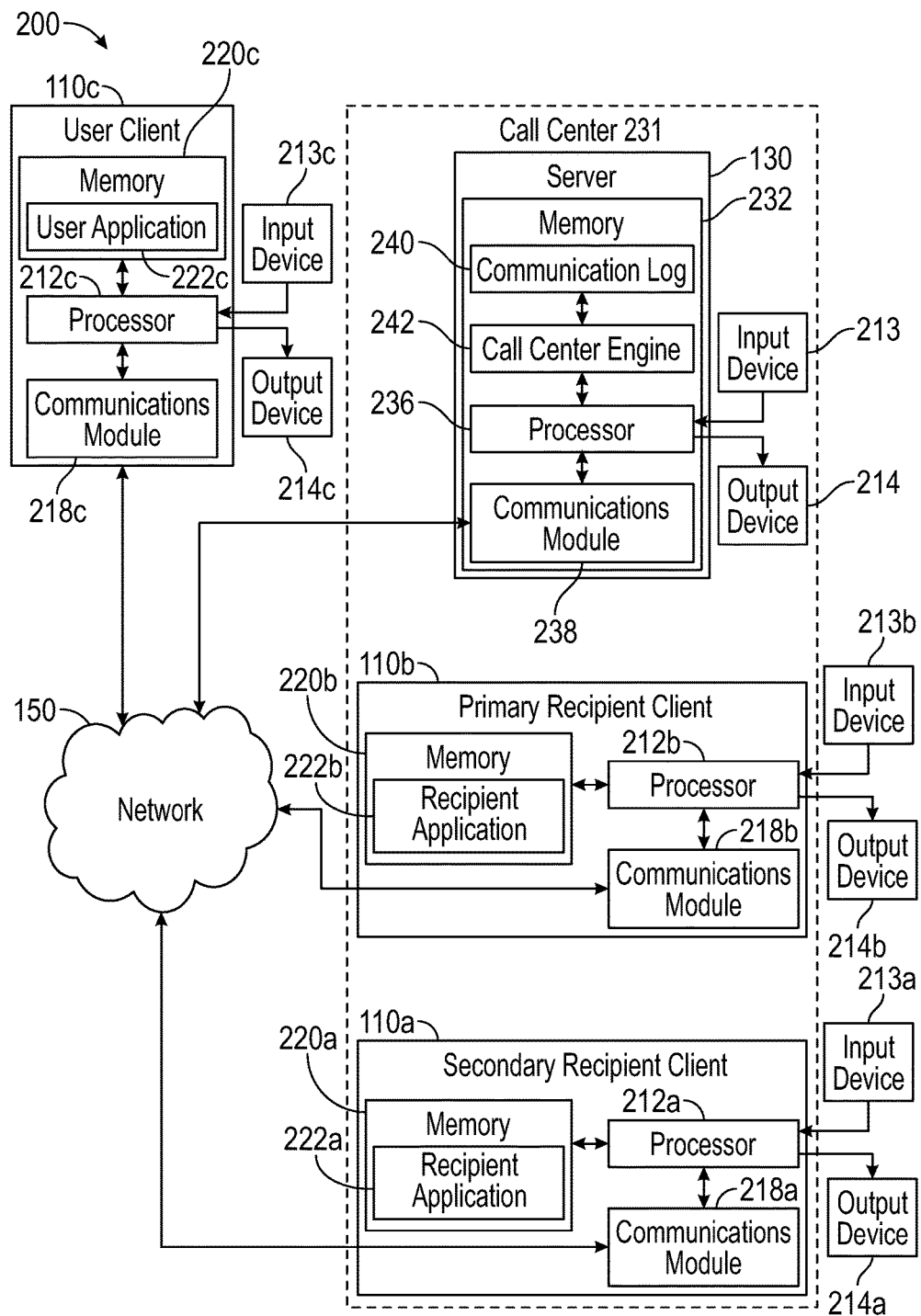
FIG. 2 is a block diagram illustrating the example servers and clients in the architecture of FIG. 1 according to certain aspects of the present disclosure.

FIG. 2 is a block diagram 200 illustrating an example server 130, a user client 110c, a primary recipient client 110b and a secondary recipient client 110a in the architecture 100 of FIG. 1 according to certain aspects of the disclosure. The server 130, user client 110c, primary recipient client 110b and secondary recipient client 110a are connected over the network 150 via their respective communications modules 238, 218c, 218b and 218a. The communications modules 218a, 218b, 218c and 238 are configured to interface with the network 150 to send and receive information, such as data, requests, responses, and commands to other devices on the network 150. The communications modules 218a, 218b, 218b and 238 can be, for example, modems or Ethernet cards.

The server 130 includes a processor 236, a communications module 238 and a memory 232. The memory 232 of the server 130 includes a communication log generator 242. The processor 236 of the server 130 is configured to execute instructions, such as instructions physically coded into the processor 236, instructions received from software in memory 232, or a combination of both. An input device 213 and an output device 214 are each operatively connected with the processor 236, and enable the input and output of data to and from the processor 236, respectively.

The user client, primary recipient client and secondary recipient client, 110c, 110b, 110a include processors 212c, 212b and 212a, communications modules 218c, 218b, 218a and memories 220c, 220b, 220a that include applications 222c, 222b, 222a. The user client 110c, the primary recipient client 110b and secondary recipient client 110a also each include an input device 213c, 213b, 213a, such as a keyboard, touchscreen, microphone, trackball and/or mouse, and an output device 214c, 214b, 214a, such as a display and/or audio speaker. The processors 212a, 212b, 212c of the clients 110a, 110b, 110c are configured to execute instructions, such as instructions physically coded into the processors 212a, 212b, 212c, instructions received from software (e.g. call center engine 242) in memories 220a, 220b, 220c, or a combination of both. For example, instructions from the call center engine 242 may be a module executed by the processor 236 to receive a plurality of communication logs related to the communication.

The call center 231, in some implementations, is a group of people, entities or recipients, which may be within or a part of a company, designated to interact with people, entities or recipients outside the company. Interactions may be inbound, meaning initiated by a party outside the company, or outbound, meaning initiated by the company. The call center 231 can be physically isolated from other members of the organization (including outsourced) or it may be a virtual designation.

In some implementations, the present disclosure provides a system 200 for routing communications between different recipients, or recipient clients and user clients, at an entity having access to a shared communication log and using presence information. The system 200 can include a memory having instructions and one or more processors 212a, 212b, 212c.

The processors 212a, 212b, 212c can be configured to execute the instructions to receive a communication from a user to an entity by a primary recipient at a call center 231 for the entity, wherein the recipient at the call center 231 is assigned to receive incoming communications placed to the entity. The user can communicate via the user client 110c, which may be a mobile device, a computer or any other electronic communication device known to those skilled in the art.

The processors 212a, 212b, 212c can be configured to execute the instructions to obtain identifying information for the user. Identifying information can include, for example, names, telephone numbers, geographic locations, employer information, roles, titles or other information associated with, or identifying, the user.

The processors 212a, 212b, 212c can be configured to store a communication log regarding the communication of the user, and to identify a current presence of a secondary recipient for the entity. The secondary recipient can be apart from, or located remotely from, the call center 231. In some implementations, the secondary recipient can be located in a different building, room, geographic area and/or computer network than the call center 231.

The processors 212a, 212b, 212c can be configured to transfer the communication from the primary recipient to the secondary recipient in response to the presence identification of the secondary recipient indicating the secondary recipient is accessible, and to update the communication log with information regarding the transfer from the primary recipient to the secondary recipient. For example, if the presence identification of the secondary recipient indicates the secondary recipient is available to receive a call, then the communication from the user is transferred from the primary recipient to the secondary recipient so that the secondary recipient can communicate with the user.

The processors 212a, 212b, 212c can be configured to provide the communication log to the secondary recipient during the communication between the first user and the primary recipient or secondary recipient, and to transfer the communication from the secondary recipient to a tertiary recipient apart from the call center. The providing of the communication log can be displaying the communication log to the secondary recipient while the communication log is updated in real-time.

The processors 212a, 212b, 212c can also be configured to update the communication log with information regarding the transfer from the secondary recipient to the tertiary recipient, and to provide the communication log to the tertiary recipient. The communication log can include information regarding an entity that answered the communication, transferred the communication or conferenced the communication, and/or information regarding to which entity the communication has been transferred to or conferenced with.

The identifying information can include at least one of a telephone number, geographic information, role information, company information and a name for the user, and the identifying the current presence of the secondary recipient can include initiating a communication between the primary recipient and the secondary recipient.

The system can further include transferring the communication from the secondary recipient to a recipient at the call center 231, and transferring the communication from the primary recipient to another recipient at the call center 231 distinct from the primary recipient and subsequent to the transferring of the communication from the secondary recipient to the primary recipient. The other recipient at the call center 231 distinct from the primary recipient can be located in another area of the call center 231, or can be operating on a different computer network from the primary recipient.

The communication can include audio communications, and can enable video communication between the user and at least one of the primary recipient and the secondary recipient. The communication can be received from a queue of communications assigned to the call center 231. Further, the communication can also include text messaging, "instant messaging," VOIP and video conferencing, among other methods.

The communication can be a multi-modal communication that includes a first communication modality and a second communication modality that is different from the first communication modality. The first and second communication modality may be at least one of chat, voice, video, meeting or voice over Internet protocol (VoIP). The device may be at least one of a hard phone, soft phone, a mobile device, a fax machine, a smartphone or a desktop computer. The plurality of aggregated actions may include at least one of initiating the multi-modal communication, establishing a connection for the multi-modal communication, or terminating the multi-modal communication. The one or more actions may include content that is shared or a list of actions performed during the multi-modal communication. The first device's communication modality may be different from the second device's communication modality.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
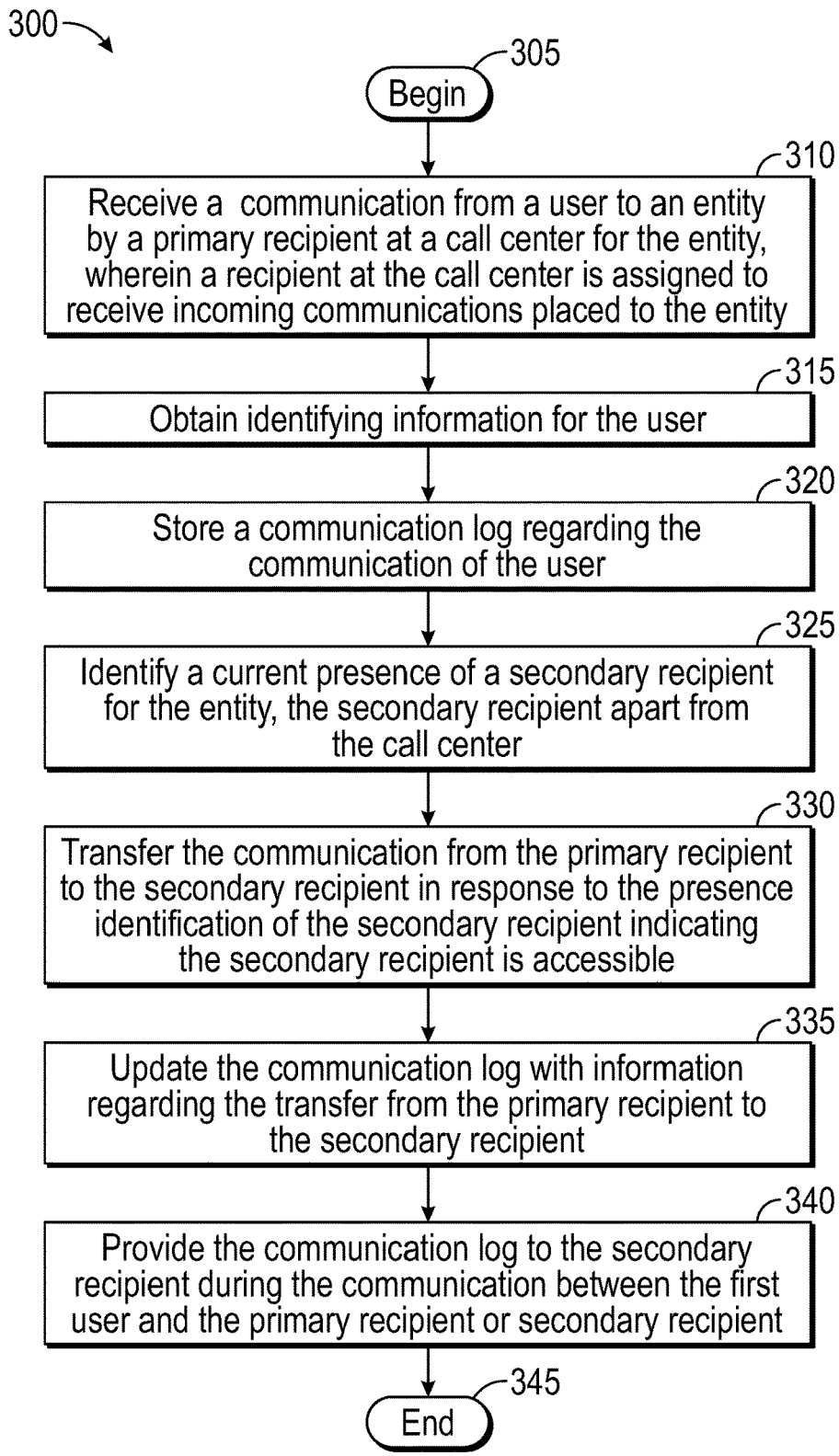
FIG. 3 sets forth an example process for routing communications between different recipients at an entity having access to a shared communication log according to certain aspects of the present disclosure.

FIG. 3 illustrates an exemplary process 300 for routing communications between different recipients at an entity having access to a shared communication log and using presence information using the example system of FIG. 2. While FIG. 3 is described with reference to FIG. 2, it should be noted that the process steps of FIG. 3 may be performed by other systems. The process 300 begins by proceeding from step 305 to step 310 by receiving a communication from a user to an entity by a primary recipient at a call center 231 for the entity, wherein a recipient at the call center 231 is assigned to receive incoming communications placed to the entity. In step 315, identifying information for the user is obtained. In step 320, a communication log regarding the communication of the user is stored. In step 325, a current presence of a secondary recipient for the entity is identified, and the secondary recipient can be apart from, or located remotely to, the call center 231.

The process 300 continues with step 330, where the communication is transferred from the primary recipient to the secondary recipient in response to the presence identification of the secondary recipient indicating the secondary recipient is accessible. In step 335, the communication log is updated with information regarding the transfer from the primary recipient to the secondary recipient. In step 340, the communication log is provided to the secondary recipient during the communication between the first user and the primary recipient or secondary recipient. The process 300 ends at step 345.

Having described a process 300 for routing communications between different recipients at an entity having access to a shared communication log and using presence information using the example system of FIG. 2, an example of such a process will now be described using the example server 130 of FIG. 2 and having a smartphone as the exemplary user client 110c, a primary desktop running a primary recipient application 222b as the exemplary primary recipient client 110b and a secondary desktop running a secondary recipient application 222a as the exemplary secondary recipient client 110a. Additionally, the below example will include a call center agent as the primary recipient, an agent remote from the call center as the secondary recipient, a subject matter expert as the tertiary recipient, a company as the entity and a telephone call as the communication. It is to be understood that such an example is non-limiting. When connected, the user of the smartphone 110a, the user of the first desktop 110b and the user of the second desktop 110c participate in a communication, which can be a multi-modal communication. The communication includes a first communication modality such as voice communication transmitted between the smartphone 110a and the desktops 110b and 110c via their respective meeting applications and a second communication modality such communication related to the meeting applications running on the first desktop 110b and the second desktop 110c.

Figure 4:
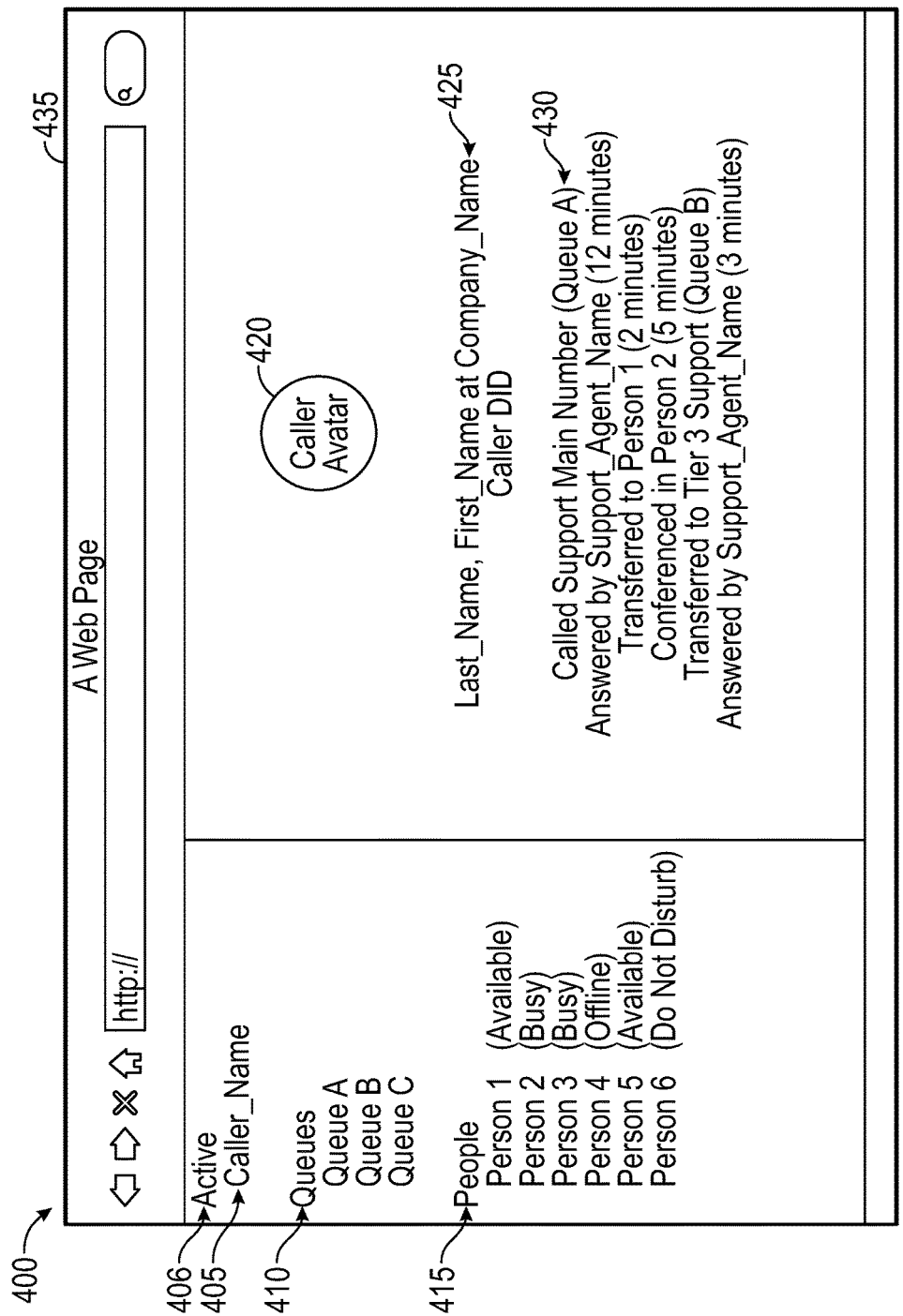
FIG. 4 illustrates an example screenshot of a user interface in which the process for routing communications between different recipients at an entity can be visualized to show a list of users participating in communications.

The process 300 begins by proceeding from step 305 to step 310 by receiving a telephone call from a user to a company by a primary recipient application 222b at a call center 231 for the company, wherein a call center agent at the call center 231 is assigned to receive incoming telephone calls placed to the company. In step 315, identifying information for the user is obtained. In step 320, a communication log regarding the telephone call of the user is stored. In step 325, a current presence of an agent remote from call center for the company is identified. FIG. 4 illustrates an example screenshot of a user interface in which a current presence of an agent remote from call center for the company is identified. The user interface can show both a communication log between a user, primary recipient, secondary recipient and tertiary recipient, or between individuals and a group and between groups. In some implementations, the computer-implemented method for routing communications between different recipients at an entity having access to a shared communication log and using presence information can be visualized to track and provide rich insights about advanced communication flows and highlight communication flows across multiple devices.

As illustrated in the example screenshot 400 of FIG. 4, the example screenshot 400 provides a user interface of the primary recipient application 222b in a web browser 435. The user interface includes an identification of the primary recipient 405, as well as a current presence status 406. The user interface also includes an identification of queues 410, from which callers to the call center 231 can be retrieved.

The interface for the queues 410 also permits the primary recipient 405 viewing the user interface to view other callers in the queue 410. For example, one such caller is identified with a caller avatar 420, as well as additional identifying information 425 from the caller. The additional identifying information 425 can include a caller's first name, last name, full name, company name, role, title, Direct Inward Dialing (DID) information or any other identifying information of the caller.

Also displayed in the user interface is a communication log 430 for the caller. The communication log 430 includes a main number called by the caller, whether an entity, such as the primary recipient 405, a secondary recipient, a tertiary recipient or a person, has answered the communication, whether an entity, such as the primary recipient 405, secondary recipient, tertiary recipient or a person, has transferred the communication, and whether an entity, such as the primary recipient 405, secondary recipient, tertiary recipient or person, has conferenced the communication. Further, the communication log 430 can include to which entity, such as the primary recipient 405, secondary recipient, tertiary recipient or person, the communication has been transferred to or conferenced with.

The user interface also includes an identification of additional recipients capable of communication with the caller. The recipients can be apart from the call center, or located remotely from the call center, and not typically assigned to receive incoming communications from the queues 410.

The identification of the recipients can include a current presence status for the recipients, such as "available," "busy," "offline" and "do not disturb." The user interface permits the primary recipient 405 to connect the caller identified by the caller avatar 420 to be connected to any of the recipients 415, which can be a function of their presence information.

Returning to the process 300 of FIG. 3, the process 300 continues with step 330, where the telephone call is transferred from the primary recipient application 222b to the secondary recipient application 222a in response to the presence identification of the secondary recipient application 222a indicating the agent remote from the call center is accessible. In step 335, the communication log is updated with information regarding the transfer from the primary recipient application 222b to the secondary recipient application 222a. In step 340, the communication log is provided to the secondary recipient application 222a during the telephone call between the user and the call center agent or the agent remote from the call center. The process 300 may end at step 345, or further steps can be included.

For example, further steps can include transferring the telephone call from the secondary recipient application 222a to a tertiary recipient application apart from the call center 231, updating the communication log with information regarding the transfer from the secondary recipient application 222a to the tertiary recipient application, and providing the communication log to the tertiary recipient application.

The identifying information can include at least one of a telephone number and a name for the user, and in some implementations, further includes a geographic location, employer information, a role, a title or other information associated with, or identifying, the user.

The step of identifying the current presence of the agent remote from the call center can include initiating a communication between the primary recipient application 222b and the secondary recipient application 222a. The communication can include voice, chat, text, email, fax, video or other modes of communication.

The process can also include transferring the telephone call from the secondary recipient application 222a to a recipient at the call center 231. The recipient at the call center 231 can be different than the call center agent, and the process can further include transferring the telephone call from the primary recipient application 222b to another recipient at the call center 231 distinct from the primary recipient and subsequent to the transferring of the telephone call from the secondary recipient application 222a to the primary recipient application 222b.

While the communication includes a telephone call, the communication can also include video communication between the user and at least one of the primary recipient application 222b and the secondary recipient.

The telephone call can be received from a queue of telephone calls assigned to the call center 231.

The secondary recipient application 222a can include a plurality of recipients, and the transferring of the telephone call from the primary recipient application 222b to the secondary recipient application 222a includes transferring the telephone call from the primary recipient application 222b to the plurality of recipients for communication between the user and the plurality of recipients.

The process can further include sending an invitation from the primary recipient application 222b to a tertiary recipient application to join the telephone call with the user, and a tertiary recipient can be located apart from the call center 231. Upon acceptance of the invitation, the tertiary recipient can join in a conference telephone call including the user, the primary recipient and the tertiary recipient.

The process can further include, identifying a current presence of a tertiary recipient for the entity. When the identification indicates the tertiary recipient is available, the tertiary recipient being located apart from the call center, receiving a join request from the primary recipient to join the tertiary recipient to the telephone call with the user and forming a conference telephone call including the user, the primary recipient, and the tertiary recipient without acknowledgment by the tertiary user.

Hardware Overview

Figure 5:
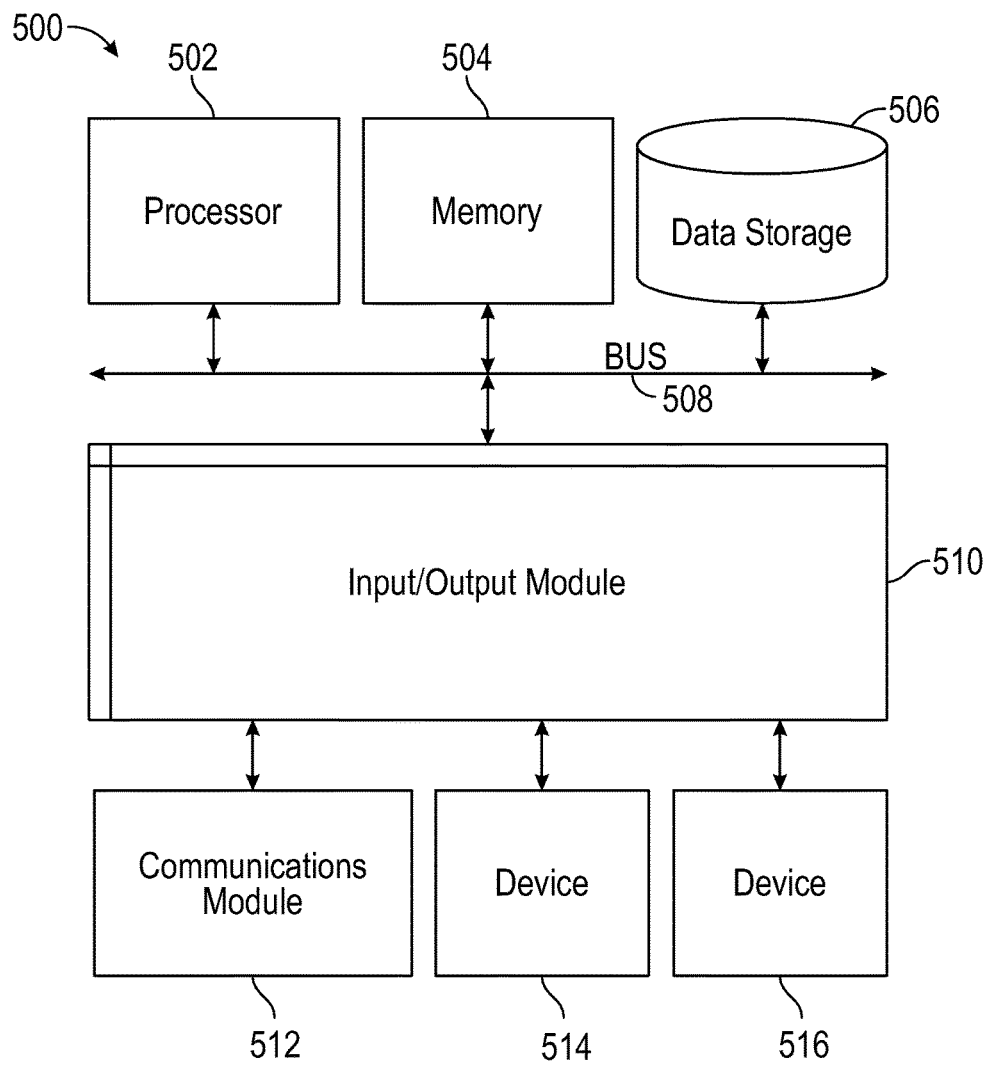
FIG. 5 is a block diagram illustrating an example computer system with which the example clients and server of FIG. 2 can be implemented.

FIG. 5 is a block diagram illustrating an example computer system 500 with which clients 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., clients 110a, 110b and server 130) includes a bus 508 or other communication mechanism for communicating information, and a processor 502 (e.g., processor 212 and 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 232a and 232b), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., 238a and 238b) include networking interface cards, such as Ethernet cards and modems.

The components of the system can be interconnected by any form or medium of digital data communication, e.g., a communication network. The communication network (e.g., communication network 150) can include, for example, any one or more of a PAN, a (LAN), a CAN, a MAN, a (WAN, a BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may include appropriate circuitry for driving the output device 516 to present graphical and other information to a user.

According to one aspect of the present disclosure, the clients 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system [#6]00 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for routing communications between different recipients at an entity having access to a shared communication log and using presence information, the method comprising:
   receiving a communication from a user to an entity by a primary recipient at a call center for the entity, wherein a recipient at the call center is assigned to receive incoming communications placed to the entity;
   obtaining identifying information for the user;
   storing a communication log regarding the communication of the user;
   identifying a current presence of a secondary recipient for the entity, the secondary recipient apart from the call center;
   transferring the communication from the primary recipient to the secondary recipient in response to the presence identification of the secondary recipient indicating the secondary recipient is accessible;
   updating the communication log with information regarding the transfer from the primary recipient to the secondary recipient; and
   providing the communication log to the secondary recipient during the communication between the first user and the primary recipient or secondary recipient.

2. The method of claim 1, further comprising:
   transferring the communication from the secondary recipient to a tertiary recipient apart from the call center;
   updating the communication log with information regarding the transfer from the secondary recipient to the tertiary recipient; and
   providing the communication log to the tertiary recipient.

3. The method of claim 1, wherein the identifying information comprises at least one of a telephone number and a name for the user.

4. The method of claim 1, wherein the identifying the current presence of the secondary recipient comprises initiating a communication between the primary recipient and the secondary recipient.

5. The method of claim 1, further comprising:
   transferring the communication from the secondary recipient to a recipient at the call center.

6. The method of claim 5, wherein the recipient at the call center is different than the primary recipient.

7. The method of claim 5, further comprising transferring the communication from the primary recipient to another recipient at the call center distinct from the primary recipient and subsequent to the transferring of the communication from the secondary recipient to the primary recipient.

8. The method of claim 1, wherein the communication comprises audio communication, and wherein the communication is configured to enable video communication between the user and at least one of the primary recipient and the secondary recipient.

9. The method of claim 1, wherein the communication is received from a queue of communications assigned to the call center.

10. The method of claim 1,
    wherein the secondary recipient comprises a plurality of recipients, and
    wherein the transferring of the communication from the primary recipient to the secondary recipient comprises transferring the communication from the primary recipient to the plurality of recipients for communication between the user and the plurality of recipients.

11. The method of claim 1, further comprising:
sending an invitation from the primary recipient to a tertiary recipient to join the communication with the user, the tertiary recipient apart from the call center; and
upon acceptance of the invitation, joining in a conference communication the user, the primary recipient, and the tertiary recipient.

12. The method of claim 1, further comprising:
identifying a current presence of a tertiary recipient for the entity indicates the tertiary recipient is available, the tertiary recipient apart from the call center;
receiving a join request from the primary recipient to join the tertiary recipient to the communication with the user; and
forming a conference communication comprising the user, the primary recipient, and the tertiary recipient without acknowledgment by the tertiary user.

13. A system for routing communications between different recipients at an entity having access to a shared communication log and using presence information, the system comprising:
a memory comprising instructions;
one or more processors configured to execute the instructions to:
receive a communication from a user to an entity by a primary recipient at a call center for the entity, wherein a recipient at the call center is assigned to receive incoming communications placed to the entity;
obtain identifying information for the user;
store a communication log regarding the communication of the user;
identify a current presence of a secondary recipient for the entity, the secondary recipient apart from the call center;
transfer the communication from the primary recipient to the secondary recipient in response to the presence identification of the secondary recipient indicating the secondary recipient is accessible;
update the communication log with information regarding the transfer from the primary recipient to the secondary recipient;
provide the communication log to the secondary recipient during the communication between the first user and the primary recipient or secondary recipient;
transfer the communication from the secondary recipient to a tertiary recipient apart from the call center;
update the communication log with information regarding the transfer from the secondary recipient to the tertiary recipient; and
provide the communication log to the tertiary recipient.

14. The system of claim 13, wherein the identifying information comprises at least one of a telephone number and a name for the user.

15. The system of claim 13, wherein the identifying the current presence of the secondary recipient comprises initiating a communication between the primary recipient and the secondary recipient.

16. The system of claim 13, further comprising:
transferring the communication from the secondary recipient to a recipient at the call center.

17. The system of claim 13, further comprising transferring the communication from the primary recipient to another recipient at the call center distinct from the primary recipient and subsequent to the transferring of the communication from the secondary recipient to the primary recipient.

18. The system of claim 13, wherein the communication comprises audio communication, and wherein the communication is configured to enable video communication between the user and at least one of the primary recipient and the secondary recipient.

19. The system of claim 13, wherein the communication is received from a queue of communications assigned to the call center.

20. A non-transitory machine-readable storage medium comprising machine-readable instructions for causing a processor to execute a method for routing communications between different recipients at an entity having access to a shared communication log and using presence information, the method comprising:
receiving a communication from a user to an entity by a primary recipient at a call center for the entity, wherein a recipient at the call center is assigned to receive incoming communications placed to the entity;
obtaining identifying information for the user;
storing a communication log regarding the communication of the user;
identifying a current presence of a secondary recipient for the entity, the secondary recipient apart from the call center;
transferring the communication from the primary recipient to the secondary recipient in response to the presence identification of the secondary recipient indicating the secondary recipient is accessible;
updating the communication log with information regarding the transfer from the primary recipient to the secondary recipient;
providing the communication log to the secondary recipient during the communication between the first user and the primary recipient or secondary recipient;
transferring the communication from the secondary recipient to a tertiary recipient apart from the call center;
updating the communication log with information regarding the transfer from the secondary recipient to the tertiary recipient;
providing the communication log to the tertiary recipient;
transferring the communication from the secondary recipient to a recipient at the call center; and
transferring the communication from the primary recipient to another recipient at the call center distinct from the primary recipient and subsequent to the transferring of the communication from the secondary recipient to the primary recipient,
wherein the identifying the current presence of the secondary recipient comprises initiating a communication between the primary recipient and the secondary recipient,
wherein the communication comprises audio communication, and wherein the communication is configured to enable video communication between the user and at least one of the primary recipient and the secondary recipient, wherein the communication is received from a queue of communications assigned to the call center,
wherein the secondary recipient comprises a plurality of recipients, and
wherein the transferring of the communication from the primary recipient to the secondary recipient comprises transferring the communication from the primary recipient to the plurality of recipients for communication between the user and the plurality of recipients.

* * * * *